(12) United States Patent
Kuo

(10) Patent No.: US 11,197,265 B2
(45) Date of Patent: Dec. 7, 2021

(54) MOVING PATH DETERMINING METHOD AND WIRELESS POSITIONING DEVICE

(71) Applicant: Wistron Corporation, New Taipei (TW)

(72) Inventor: Chin-Shuo Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/920,745

(22) Filed: Jul. 5, 2020

(65) Prior Publication Data

US 2021/0306978 A1    Sep. 30, 2021

(30) Foreign Application Priority Data

Mar. 25, 2020   (TW) ................................. 109109989

(51) Int. Cl.
| | |
|---|---|
| *H04W 4/029* | (2018.01) |
| *H04W 64/00* | (2009.01) |
| *H04W 4/02* | (2018.01) |

(52) U.S. Cl.
CPC ......... *H04W 64/006* (2013.01); *H04W 4/025* (2013.01); *H04W 4/029* (2018.02)

(58) Field of Classification Search
CPC .................................................. H04W 64/006
See application file for complete search history.

(56) References Cited

U.S. PATENT DOCUMENTS

| | | | |
|---|---|---|---|
| 2003/0146871 A1* | 8/2003 | Karr .......................... | G01S 5/02 342/457 |
| 2012/0238274 A1* | 9/2012 | Kodama et al. .............. | 455/437 |
| 2014/0011518 A1* | 1/2014 | Valaee ..................... | H04W 4/33 455/456.1 |
| 2014/0187257 A1* | 7/2014 | Emadzadeh et al. ......... | 455/456 |
| 2016/0081054 A1* | 3/2016 | Zhang ....................... | G01S 1/00 370/252 |
| 2019/0297592 A1* | 9/2019 | Lindquist .............. | G01S 5/0242 |

FOREIGN PATENT DOCUMENTS

WO        2018063533 A1    4/2018

* cited by examiner

*Primary Examiner* — Qutbuddin Ghulamali
(74) *Attorney, Agent, or Firm* — Winston Hsu

(57) ABSTRACT

A moving path determining method, applied to a user equipment, the moving path determining method comprises performing positioning to at least three wireless communication devices via a scanning frequency in a cumulative time, to calculate a plurality of sampling positions; determining whether a measured distance value corresponding to each of the plurality of sampling positions of at least three wireless communication devices is less than a predetermined value or not; removing the sampling position corresponding to the measure distance value less than the predetermined value within the plurality of sampling positions, to obtain a plurality of valid sampling positions; calculating a count value of the plurality of valid sampling positions; and determining a current position of the user equipment according to the count value and a smoothing threshold.

16 Claims, 6 Drawing Sheets

MOVING PATH DETERMINING METHOD AND WIRELESS POSITIONING DEVICE

BACKGROUND OF THE INVENTION

1. Field of the Invention

The present invention relates to a moving path determining method and a wireless positioning device, and more particularly, to a moving path determining method and a wireless positioning device capable of smoothing a moving path.

2. Description of the Prior Art

In wireless communication systems, positioning technology may be used to estimate locations of a user equipment to improve wireless transceiver efficiency. Common positioning technologies include time-of-arrival (TOA), angle-of-arrival (AOA), and received signal strength (RSS), etc.

In the prior art, each time when performing measurements between the user equipment and a reference point, there are certain measurement errors therebetween. Meanwhile, the user equipment and the reference point may be interfered with signals outputted from other electronic devices, which would cause burst errors, lead the user to be unable to instantly obtain the current position through the positioning technology, and cause an unnatural jumping phenomenon.

Therefore, it is necessary to improve the prior art.

SUMMARY OF THE INVENTION

It is therefore a primary objective of the present invention to provide a moving path determining method and a wireless positioning device, to improve over disadvantages of the prior art.

An embodiment of the present disclosure discloses a moving path determining method, applied to a user equipment, the moving path determining method comprises performing positioning to at least three wireless communication devices via a scanning frequency in a cumulative time, to calculate a plurality of sampling positions; determining whether a measured distance value corresponding to each of the plurality of sampling positions of at least three wireless communication devices is less than a predetermined value or not; removing the sampling position corresponding to the measure distance value less than the predetermined value within the plurality of sampling positions, to obtain a plurality of valid sampling positions; calculating a count value of the plurality of valid sampling positions; and determining a current position of the user equipment according to the count value and a smoothing threshold.

An embodiment of the present disclosure discloses a wireless positioning device, comprises a storage unit, storing a program code; and a processing unit, coupled to the storage unit, wherein the processing unit loads the program code to execute the following steps: performing positioning to at least three wireless communication devices via a scanning frequency in a cumulative time, to calculate a plurality of sampling positions; determining whether each of the plurality of sampling positions corresponding to a measure distance value of the at least three wireless communication devices is less than a predetermined value or not; removing the sampling position corresponding to the measure distance value less than the predetermined value within the plurality of sampling positions, to obtain a plurality of valid sampling positions; calculating a count value of the plurality of valid sampling positions; and determining a current position of the wireless positioning device according to the count value and a smoothing threshold.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
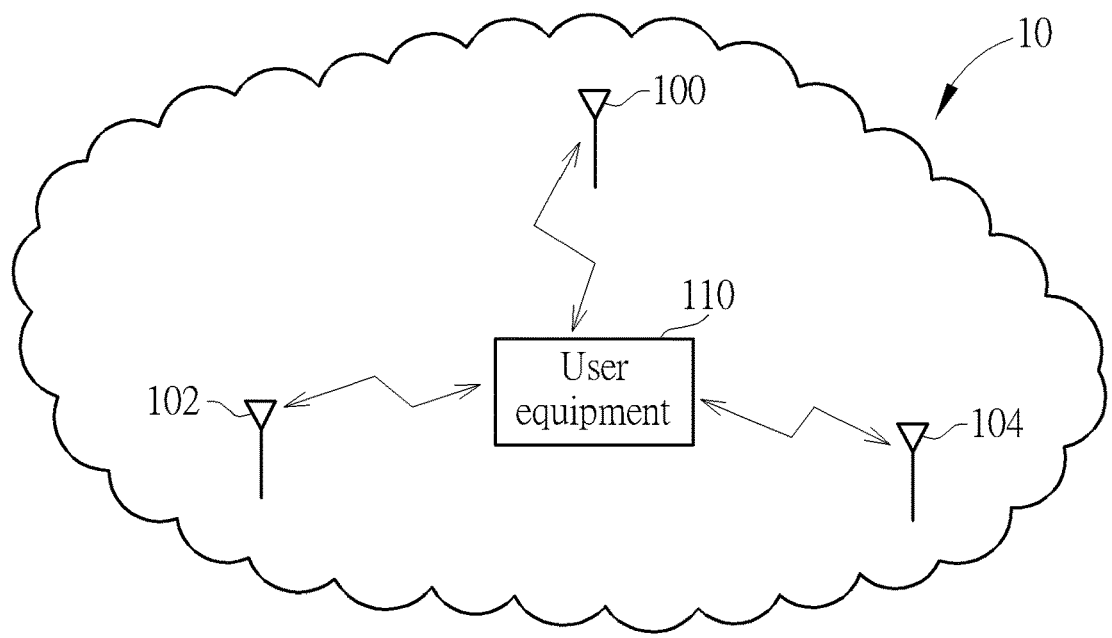
FIG. 1 is a schematic diagram of a wireless positioning system according to an embodiment of the present invention.
Figure 2:
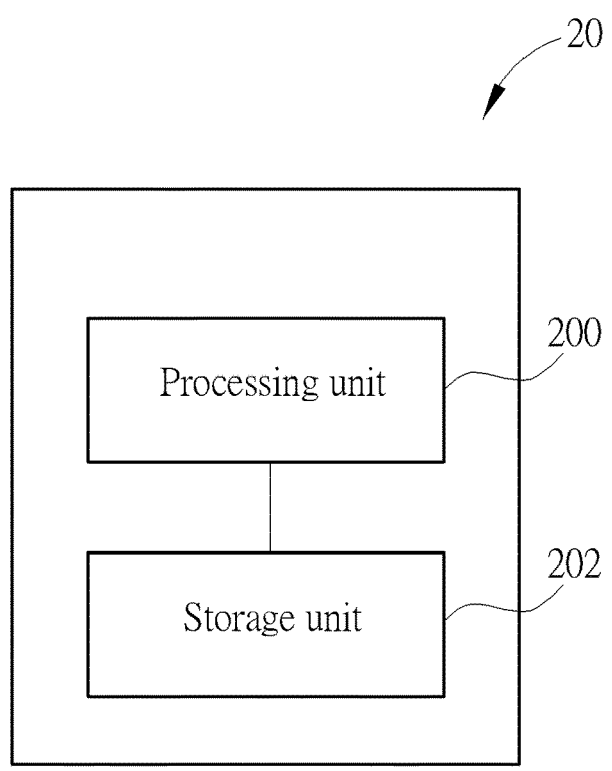
FIG. 2 is a schematic diagram of a wireless positioning device according to an embodiment of the present invention.

FIG. 1 is a schematic diagram of a wireless positioning system 10 according to an embodiment of the present disclosure. In the embodiment, the wireless positioning system 10 comprises four wireless positioning devices, which are wireless communication devices 100, 102, and 104, and a user equipment 110; however, not limited thereto, in other embodiments, the wireless positioning system 10 may comprise more than four wireless positioning devices. Furthermore, FIG. 2 is a schematic diagram of a wireless positioning device 20 according to an embodiment of the present disclosure. The wireless positioning device 20 may implement the wireless communication devices 100, 102, and 104, or the user equipment 110, which comprises a processor unit 200 and a storage unit 202. In an embodiment of the present disclosure, each unit of the wireless positioning device 20 may be implemented by an application-specific integrated circuit (ASIC). In an embodiment of the present disclosure, the processing unit 200 may be an application processor (AP), a digital signal processor (DSP), a central processing unit (CPU), a graphics processing unit (GPU) or a tensor processing unit (TPU), and not limited thereto. The storage unit 202 may store a program code, and the program code is configured to instruct the processing unit 200 to perform operations of a moving path determining method. The storage unit 202 may be a Non-volatile Memory such as an electrically erasable programmable read-only memory (EEPROM) or a flash memory, and not limited thereto.

In the wireless positioning system 10, the user equipment 110 may use the wireless communication devices 100, 102, and 104 to perform positioning. For example, when a user finds a destination through an electronic map outdoors or finds a specific exhibit in an indoor exhibition hall, he/she has to firstly confirm his/her current position, and display the position in the electronic map on the mobile device to provide a judgment basis and to find a direction to the destination. In an embodiment of the present disclosure, the wireless positioning system 10 is compatible with WIFI® 802.11mc protocol, and the user equipment 110 measures the round-trip times (RTT) from the wireless communication devices 100, 102, and 104, and measures distances and/or angles corresponding to the wireless communication devices 100, 102, and 104, so as to use spatial geometry knowledge to perform positioning. In the above embodiment, even if the user equipment 110 has not established physical communication links with the wireless communication devices 100, 102, and 104, the user equipment 110 may obtain RTT from each of the wireless communication devices 100, 102, and 104, which saves the power consumption of establishing the physical communication links. In an embodiment of the present disclosure shown in FIG. 1, if a measurement result of the user equipment 110 shows that the distances to the three wireless communication devices 100, 102, and 104 are the same, then the user equipment 110 is at a circumcenter of a triangle formed by the wireless communication devices 100, 102, and 104.

Figure 3:
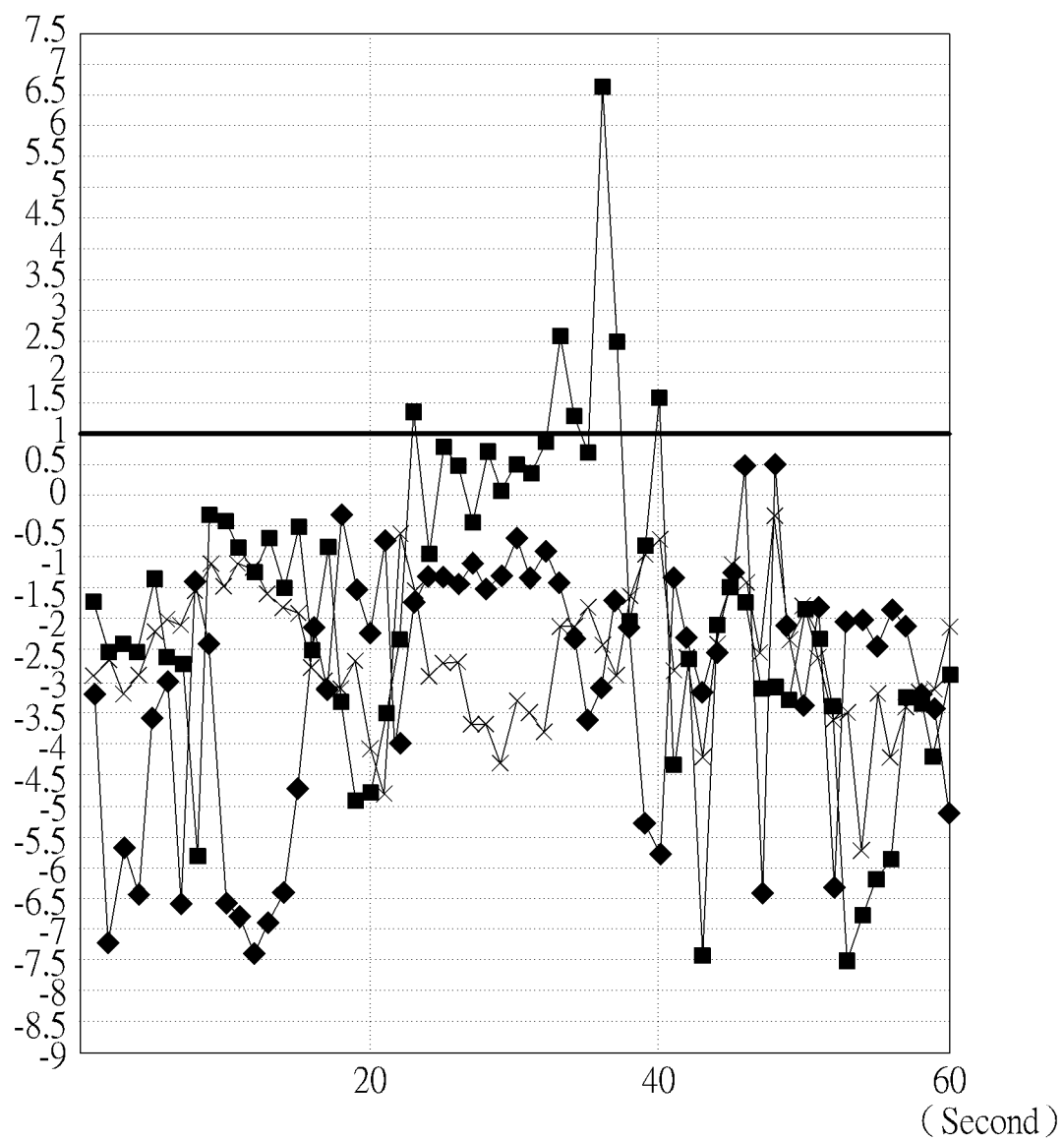
FIG. 3 is a schematic diagram of a measurement result in a WIFI® 802.11mc RTT system.

More specifically, WIFI® 802.11mc protocol may use a series of fine timing measurement (FTM) protocols. The distances between the user equipment 110 and the wireless communication devices 100, 102, and 104 may be obtained by measuring the round-trip time of signals transmitted from a transmitter to a receiver and from the receiver to the transmitter, so as to apply a trilateration method to calculate a relative position between the user equipment 110 and the wireless communication devices 100, 102, and 104. However, since the distances between the user equipment 110 and the wireless communication devices 100, 102, and 104, which are obtained with WIFI® 802.11mc RTT protocol, are based on wireless signals, there are still vibration and drifting in the measurement results even if the user equipment 110 is in a stationary state. For example, FIG. 3 is a schematic diagram of a measurement result of the user equipment 110 applying WIFI® 802.11mc RTT parameters to perform distance measurements. In FIG. 3, the distances between the user equipment 110 and the wireless communication device 100, between the user equipment 110 and the wireless communication device 102, and between the user equipment 110 and the wireless communication device 104 are 1 all meter; curves formed by diamond points, square points and X-shaped points respectively represent three measurement experiments between the user equipment 110 and the wireless communication device 100, between the user equipment 110 and the wireless communication device 102, and between the user equipment 110 and the wireless communication device 104. As shown in FIG. 3, when the actual distance between the user equipment 110 and the wireless communication device 102 is 1 meter, the measurement error may be as high as +5.5(6.5-1) or −8.5(−7.5-1) meters. In such a situation, even if the user equipment 110 is in the stationary state, if the measurement results do not undergo smoothing procedures, the position of the user equipment 110 displayed on a map would accompany an unnatural jumping phenomenon.

To exclude this phenomenon, an embodiment of the present disclosure performs positioning between the user equipment and at least three wireless communication devices in a cumulative time, to obtain a plurality of valid sampling positions and smooths the displayed path of the user equipment.

Figure 4:
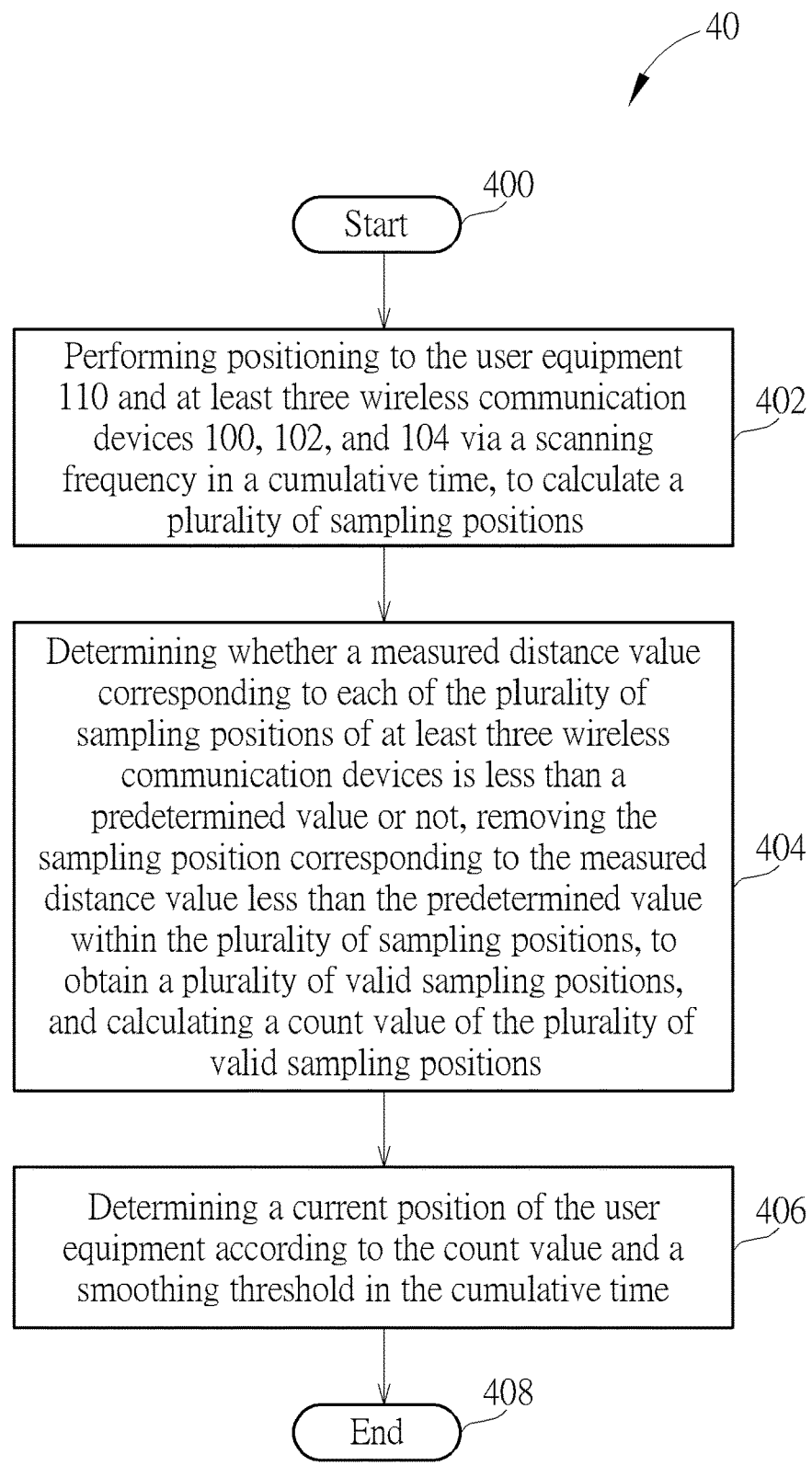
FIG. 4 is a schematic diagram of a moving path determining process according to an embodiment of the present invention.

More specifically, please refer to FIG. 4, which is a schematic diagram of a moving path determining process 40 according to an embodiment of the present disclosure. The moving path determining process 40 may be instructed by a program code, which is stored in the storage unit 202 of the wireless communication devices 100, 102, 104, or the user equipment 110 and performed by a processing unit 200 in the wireless communication devices 100, 102, 104, or the user equipment 110. As shown in FIG. 4, the moving path determining process 40 comprises the following steps:

Step 400: Start.

Step 402: Performing positioning to the user equipment 110 and at least three wireless communication devices 100, 102, and 104 via a scanning frequency in a cumulative time, to calculate a plurality of sampling positions.

Step 404: Determining whether a measured distance value corresponding to each of the plurality of sampling positions of at least three wireless communication devices is less than a predetermined value or not, removing the sampling position corresponding to the measured distance value less than the predetermined value within the plurality of sampling positions, to obtain a plurality of valid sampling positions, and calculating a count value of the plurality of valid sampling positions.

Step 406: Determining a current position of the user equipment according to the count value and a smoothing threshold in the cumulative time.

Step 408: End.

In Step 402, the user equipment 110 performs positioning to the wireless communication devices 100, 102, and 104. In an embodiment of the present disclosure, the moving path determining process 40 may appropriately supplement interpolated positions to replace unreliable or unreasonable mean positions, so as to smooth the moving path displayed on the map on the user equipment 110. Therefore, the positioning procedures between the user equipment 110 and the wireless communication devices 100, 102, and 104 are required to be performed at a specific scanning frequency (for example, 0.1 seconds, but not limited herein) to obtain a plurality of sampling positions for the subsequent steps to calculate the mean position and the interpolation position. Moreover, the cumulative time may be fixed in, for example, 1 second, but not limited thereto. The cumulative time may be pre-calibrated according to the environment, be adjusted by the time of use, or be adjusted according to the moving speed of the user equipment 110. On the other hand, the scanning frequency may be adjusted according to different application scenarios. For example, in a navigation equipment for an interference environment (such as a department store), the length of the cumulative time may be increased to reduce the measurement error; in a mobile assistive device (such as wheelchair, electric scooter, etc.), if the moving speed of the mobile assistive device is low, the scanning frequency may be decreased to reduce power consumption. Accordingly, the user equipment 110 performs positioning to the wireless communication devices 100, 102, and 104 for multiple times in the cumulative time, to calculate a plurality of sampling positions.

After obtaining the plurality of sampling positions, in Step 404, the user equipment 110 obtains the distances and/or the angles of the sampling positions corresponding to the wireless communication devices 100, 102, and 104, removes the sampling positions of which the measured distances fail to meet a predetermined criterion, to obtain a plurality of valid sampling positions, and calculates a count value of the plurality of valid sampling positions. More specifically, since the obviously unreasonable measurement results should be regarded as the current measurement errors by the user equipment 110, and should be excluded from the valid sampling positions when calculating the mean position, Step 404 firstly removes the obviously unreasonable values according to the above-mentioned predetermined criterion. In an embodiment of the present disclosure, the predetermined criterion is whether the measured distance values corresponding to each of the plurality of sampling positions of at least three wireless communication devices is less than a predetermined value. In an embodiment of the present disclosure, the above-mentioned predetermined criterion may be any sampling position with a negative measured distance. In an embodiment of the present disclosure, the above-mentioned predetermined criterion may be any sampling position with a measured distance less than a predetermined value. In an embodiment of the present disclosure, the above-mentioned predetermined criterion may be that the sampling position corresponding to the measured distance value of the wireless communication device 100 is less than a predetermined value and irrelative to the measured distance value corresponding to the wireless communication device 102 or 104. In an embodiment of the present disclosure, the above-mentioned predetermined criterion may be any sampling position of which measured distance is not within the range of 1-7 meters. In an embodiment of the present disclosure, the reasonable value may be a predetermined value; for example, the measured distance is 1 meter, but is not limited thereto. In an embodiment of the present disclosure, the above-mentioned predetermined criterion may be defined by the wireless communication devices 100, 102, 104, and transmitted to the user equipment 110. For example, when the minimal reasonable distance value is 2.5 meters, the wireless communication device 100 may set the above-mentioned predetermined criterion to 2.5 meters and transmit to the user equipment 110. In another embodiment of the present disclosure, the above-mentioned predetermined condition or reasonable value may be defined by the user equipment 110. Accordingly, the user equipment 110 may obtain a sampling position more reasonably and then obtain a reasonable mean position. In addition, in Step 404, the user equipment 110 further counts the count value, which is further used to determine whether the mean position is reasonable or reliable.

In addition, in an embodiment of the present disclosure, the user equipment 110 may perform Step 404 cooperating with external equipment such as a gyroscope. By comparing the parameters such as the moving direction, the speed, and the map data provided by the external equipment, the user equipment 110 may exclude the unreasonable measurement results to obtain accurate and valid sampling positions.

Figure 5:
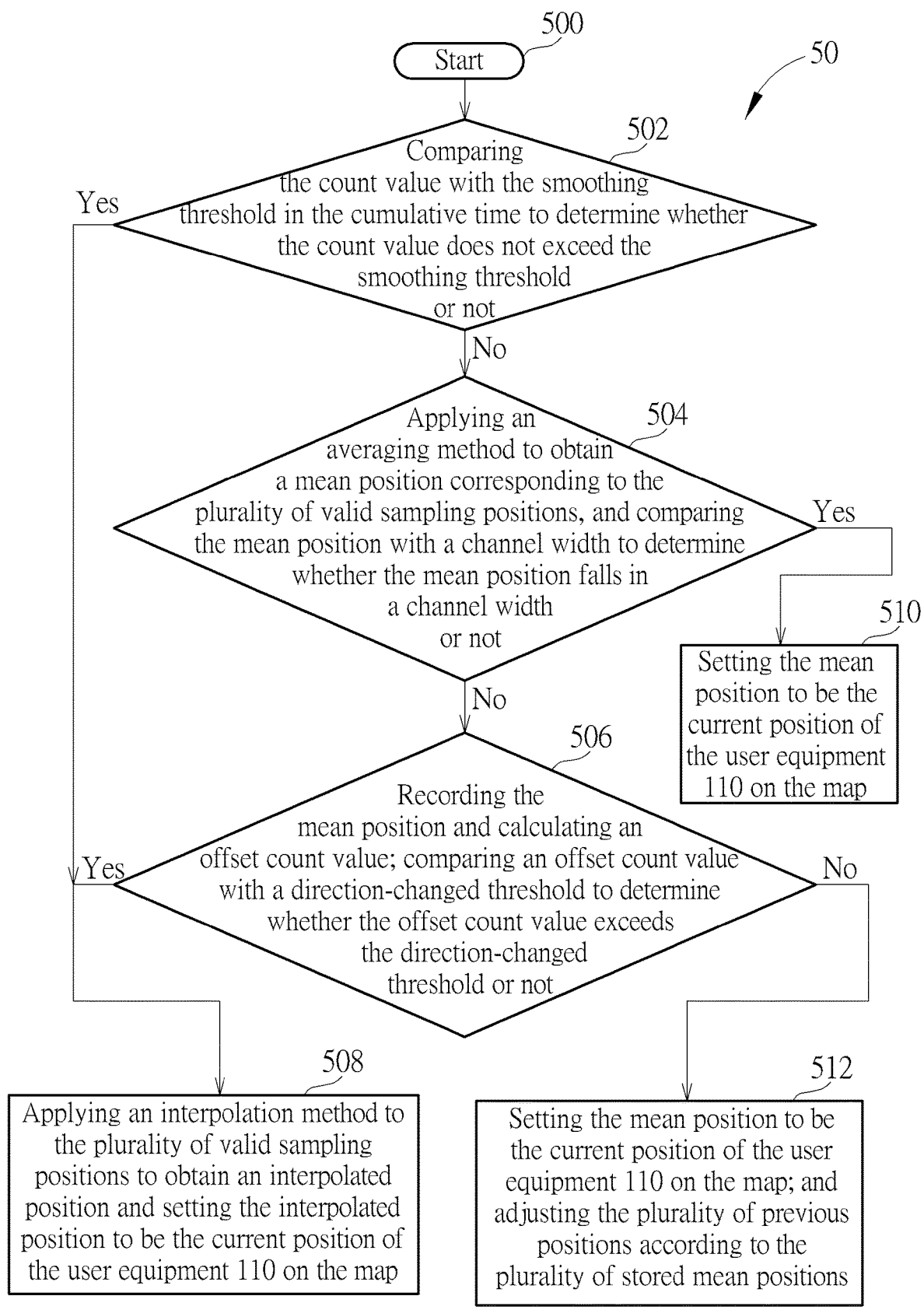
FIG. 5 is a schematic diagram of a position determining process according to an embodiment of the present invention.

Next, in Step 406, the user equipment 110 may determine a current position of the user equipment 110 according to the count value and a smoothing threshold in the cumulative time. In an embodiment of the present disclosure, the user equipment 110 may calculate a mean position corresponding to the plurality of valid sampling positions measured in Step 402, and determine whether the current mean position calculated is reliable or not, whether the distance between the mean position and the previous position of the user equipment 110 is reasonable or not, and whether the user has turned and so on according to the count value and the smoothing threshold, so as to determine the current position of the user equipment 110 on the map. The operations to determine the current position of the user equipment 110 on the map in Step 406 may be summarized in a position determining process 50, which is shown in FIG. 5. The position determining process 50 comprises the following steps:

Step 500: Start.

Step 502: Comparing the count value with the smoothing threshold in the cumulative time to determine whether the count value does not exceed the smoothing threshold or not. If the count value does not exceed the smoothing threshold, go to Step 508; otherwise, go to Step 504.

Step 504: Applying an averaging method to obtain a mean position corresponding to the plurality of valid sampling positions, and comparing the mean position with a channel width to determine whether the mean position falls in a channel width or not. If the mean position is in the channel width, go to Step 510; otherwise, go to Step 506.

Step 506: Recording the mean position and calculating an offset count value; comparing an offset count value with a direction-changed threshold to determine whether the offset count value exceeds the direction-changed threshold or not. If the offset count value does not exceed the direction-changed threshold, go to Step 508; otherwise, go to Step 512.

Step 508: Applying an interpolation method to the plurality of valid sampling positions to obtain an interpolated position and setting the interpolated position to be the current position of the user equipment 110 on the map.

Step 510: Setting the mean position to be the current position of the user equipment 110 on the map.

Step 512: Setting the mean position to be the current position of the user equipment 110 on the map; and adjusting the plurality of previous positions according to the plurality of stored mean positions.

Specifically, in Step 502, to determine the current position of the user equipment 110 on the map, the user equipment 110 firstly compares the count value with the smoothing threshold in the cumulative time. The smoothing threshold means that the count value has to reach a quantity for the user equipment 110 to determine whether the current mean position is reliable; for example, when the count value is 30, the user equipment 110 may determine that the current mean position is within the tolerance range according to the central limit theorem. In other words, if the quantity of the valid sampling positions (i.e., the count value) obtained by the user equipment 110 is less than the smoothing threshold in the cumulative time, then the mean position calculated may contain large error and may be determined as unreliable. Therefore, in Step 504, with a sufficient count value, the mean position, calculated by the user equipment 110, of the plurality of valid sampling positions in an averaging method is reliable. On the other hand, when the count value does not exceed the smoothing threshold, the user equipment 110 may perform Step 508 to apply an interpolation method to the plurality of valid sampling positions to obtain an interpolated position to replace the mean position.

In Step 504, the user equipment 110 may not only calculate the current mean position but also compare the channel width therewith, wherein the channel width is a reasonable moving range of the user equipment 110 in the cumulative time. For example, the channel width may be obtained by taking the position of the user equipment 110 as a center of a circle and its speed as a radius, and the radius may be pre-calibrated according to the environment or the practical scenario or adjusted according to the time of use. For example, the walking speed of human beings is about 1.6 meters per second, and the channel width may be set to 1.6 meters; or the user equipment 110 may measure the average and standard deviation of the moving speed during a period and set the channel to be two standard deviations of the moving speed. When the mean position calculated by the user equipment 110 is in the channel width, the user equipment 110 may determine that the mean position is reasonable and reliable and perform Step 510 to set the mean position to be the current location of the user equipment 110 on the map. In another embodiment, the user equipment 110 may determine the channel width according to an average travel speed previously measured thereby and make the channel width varied according to the average travel speed.

In Step 506, the user equipment 110 may store the mean position and compare the offset count value with a direction-changed threshold to determine whether the offset count value exceeds the direction-changed threshold or not. More specifically, when the mean position calculated by the user equipment 110 in Step 504 is out of the channel width, the user equipment 110 may determine whether the user has turned or not according to the count value (i.e., the offset count value) corresponding to a plurality of previous positions out of the channel width. For example, when the previous positions obtained by the user equipment 110 in the past two cumulative times start to be not within the channel width, and the current mean position is still out of the channel width, the offset count value is 3. In addition, the user equipment 110 may also record the mean position in the meantime. In Step 512, when the user equipment 110 subsequently determines that the user has actually turned, the restored mean position may be used to recover the estimated interpolated positions in Step 508.

In Step 508, when the count value accumulated by the user equipment 110 in Step 502 is insufficient (i.e., the offset count value does not exceed the direction-changed threshold) or when the user equipment 110 determines that the user does not turn in Step 506, the user equipment 110 may apply an interpolation method to obtain an interpolated position corresponding to the plurality of valid sampling positions and set the interpolated position to be the current position of the user equipment 110 on the map.

In Step 510, as mentioned in the above, because the user equipment 110 determines that the mean position is in the channel width with the sufficient count value, the mean position is reliable and reasonable, and the user equipment 110 may set the mean position to be the current position of the user equipment 110 on the map.

In Step 512, because the offset count value has exceeded the direction-changed threshold, the user equipment 110 may determine the user has turned. In the meantime, the user equipment 110 may set the mean position to be the current position of the user equipment 110 on the map and adjust the plurality of previous positions displayed in Step 508 according to the plurality of stored mean positions.

Therefore, with the position determining process 50, the user equipment 110 may apply the interpolation method (e.g., an inertial method that the user equipment 110 performs a uniform motion at a speed measured in the past in the embodiment) to obtain an interpolated position corresponding to a plurality of previous positions of the user equipment 110. When the mean position is unreliable or unreasonable, the embodiment may replace the mean position calculated firstly from the interpolated positions to smooth the moving path displayed on the map on the user equipment 110. In another embodiment of the present disclosure, the user equipment 110 may apply the interpolation method, such as extrapolation, to obtain an interpolated position corresponding to a plurality of previous mean positions, and set the interpolated position to be the current position of the user equipment 110 on the map. In another embodiment of the present disclosure, the user equipment 110 may perform positioning to the wireless communication devices 100, 102, and 104 to obtain a plurality of valid sampling positions, apply an interpolation method, such as interpolation, to calculate an interpolated position corresponding to a plurality of valid sampling positions, and set the interpolated position to be the current position of the user equipment 110 on the map.

In short, in the embodiment, the user equipment 110 performs positioning to the wireless communication devices 100, 102, and 104 in the cumulative time to obtain a plurality of valid sampling positions, and applies an averaging method to calculate a mean position of a plurality of valid sampling positions, or applies an interpolation method to calculate an interpolated position corresponding to a plurality of previous positions, and supplements the interpolated position appropriately to smooth the moving path displayed on the map on the user equipment 110.

Figure 6A:
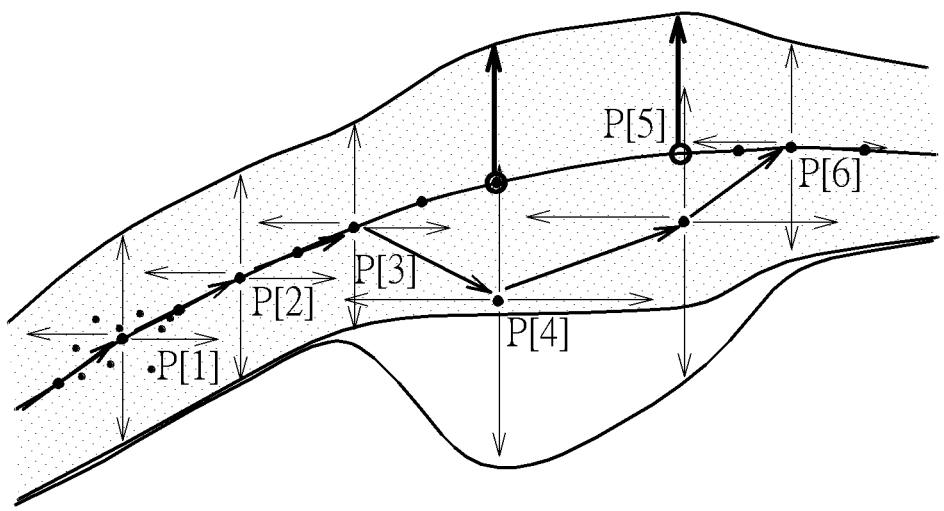
FIG. 6A to FIG. 6D are schematic diagrams of the user equipment according to the moving path determining process and the position determining process.

Regarding detailed operations of the moving path determining process 40 and the position determining process 50, please also refer to FIG. 6A to FIG. 6D, which are schematic diagrams of the user equipment 110 determining the moving path according to the moving path determining process 40 and the position determining process 50. In the embodiment, suppose that the cumulative time is 1 second, the scanning frequency is 10 Hz, the direction-changed threshold is 3 times, and the channel width (illustrated in the band) is 1.6 meters according to the walking speed of human beings (according to step 504). As shown in FIG. 6A, P[k] is the mean position at the k-th second, subtracting the negative distance value from ten points in the kth-0.9, k-0.8, k-0.7 . . . . In FIG. 6A, the mean position P[4] measured at the 4th second is slightly shifted from the trajectory of P[1], P[1.1], . . . , P[3], but is still in the channel, and the user device 110 may determine that the trajectory offset is a reasonable movement of the user, and (according to Step 510) determine that the current position on the map is the mean position P[4].

Figure 6B:
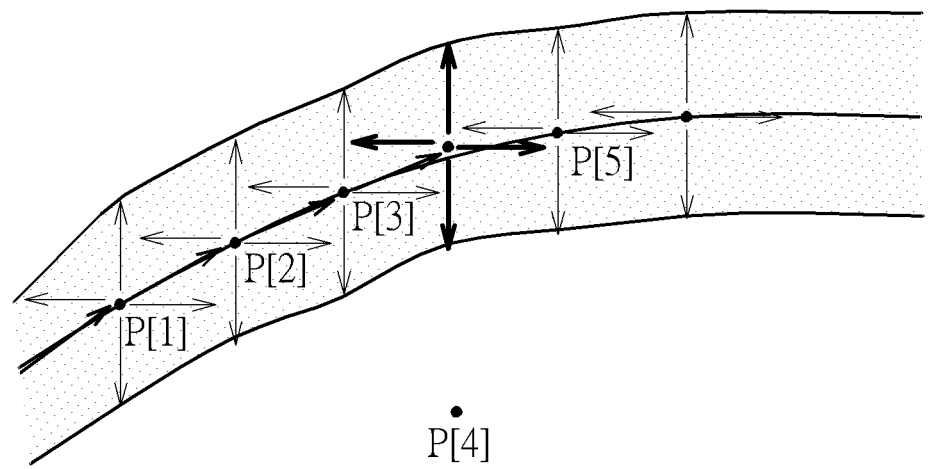

Similar to the determining method in FIG. 6A, in FIG. 6B, the mean position P[4] measured in the 4th second is out of the channel width (that is, the mean position in step 504 is not in the channel width), and all of P[5], P[6] . . . are in the channel (that is, the offset count value in step 506 does not exceed the direction-changed threshold). Accordingly, the user equipment 110 may determine the trajectory offset is an error in measurement and apply the inertial method (an interpolation method according to Step 508) to obtain an interpolated position corresponding to a plurality of previous positions P[t], t<4, to replace the current position on the map.

Figure 6C:
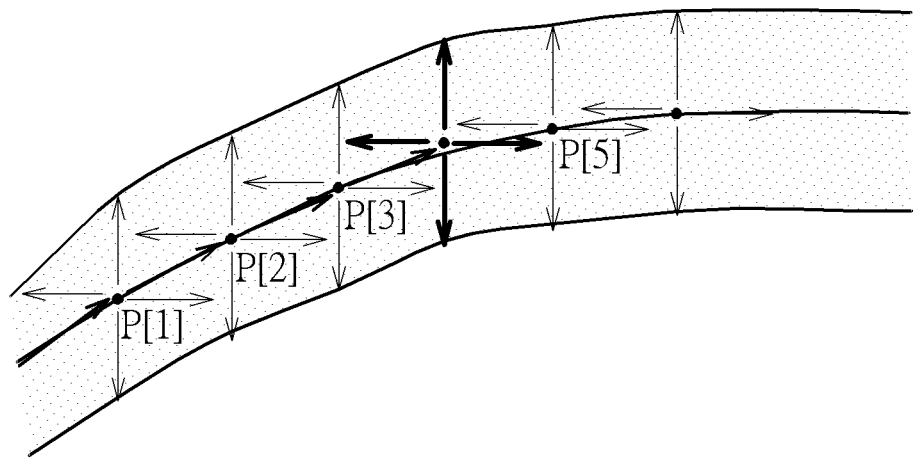

In FIG. 6C, the number of reasonable measurement results around the 4th second is too less because of the burst error or other factors. That is, the count value in step 502 does not exceed the smoothing threshold. The user equipment 110 may still apply the inertial interpolation method to supplement the current position on the map.

Figure 6D:
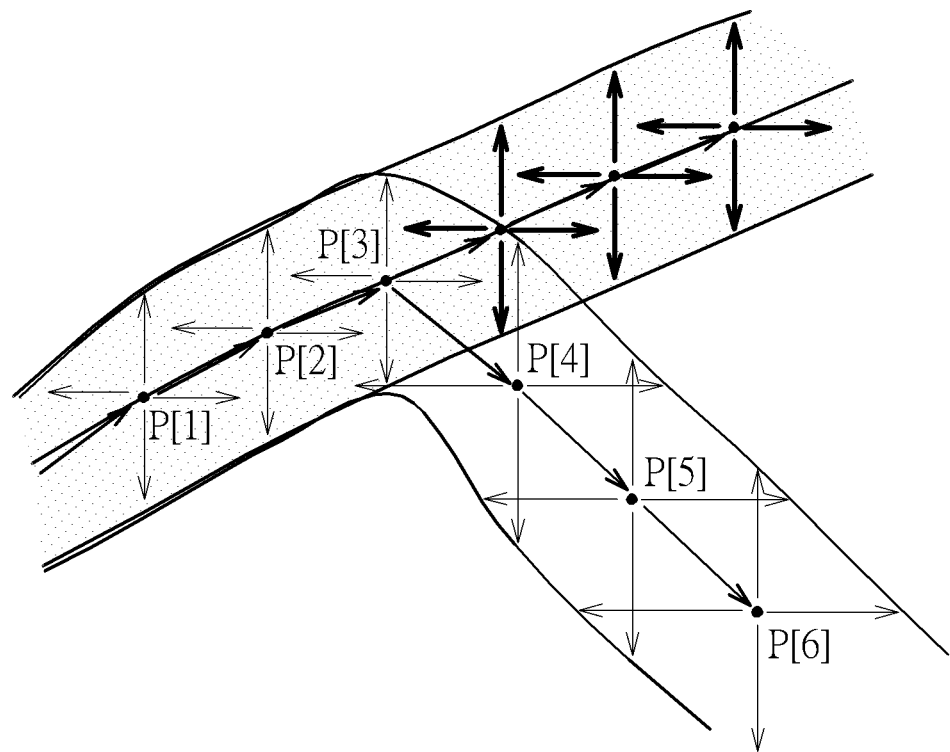

In FIG. 6D, all of P[4], P[5], and P[6] are out of the channel. That is, the offset count value in Step 506 exceeds the direction-changed threshold. The user equipment 110 may determine that the user has turned. The user equipment 110 may set the mean position P[6] to be the current position of the user equipment 110 on the map, and also adjust the plurality of previous positions P[4], P[4.1], . . . , P[5.9] displayed on the map, which are determined as the measurement error in the previous time, to fit the path practically.

Therefore, as shown in FIG. 6A to FIG. 6D, in an embodiment of the present disclosure, the user equipment 110 not only obtains a mean position in the cumulative time but also appropriately supplements the interpolated position to smooth the moving path displayed in the space.

Notably, the embodiments stated in the above are utilized for illustrating the concept of the present application. Those skilled in the art may make modifications and alterations accordingly, and not limited herein. For example, the mean position in Step 406 may be a simple average, a weighted average, or applied by other methods which may remove high-frequency noise, or the maximum and minimum values may be removed before calculating the mean position, and the interpolation method may be based on inertial method, equal acceleration motion method or other function interpolation formulas. In addition, more than one of the above-mentioned methods may also be applied according to the practical scenario. The method of time series prediction is known to those skilled in the art, which is not narrated herein for brevity.

Notably, FIG. 1 illustrates an embodiment of the present disclosure, those skilled in the art may make modifications and alterations accordingly, and not limited herein. For example, the user equipment 110 may be a tag, which is measured by the wireless communication devices 100, 102, and 104. In addition, the measurement parameters comprise but not limited to the time of arrival (TOA), the time difference of arrival (TDOA), the angle-of-arrival (AOA), the received signal strength indication (RSSI), and the RTT in WIFI® 802.11mc protocol. The configuration method of the transceiver is known to those skilled in the art, which is not narrated herein for brevity.

In addition, in an embodiment of the present disclosure, the channel width may be chosen to be less than the measurement error of the protocol applied in the above embodiments, to explicitly distinguish from the measurement error or shift. For example, as shown in FIG. 3, the measurement result in WIFI® 802.11mc protocol may introduce an error about 8 meters, so that the channel width may be chosen to be less than 4 meters to exclude significant measurement errors. The range of the channel width may be varied according to the moving speed of the user as well, to compromise with user's moving behavior.

In an embodiment of the present disclosure, the whole of the wireless positioning system 10 locates indoors; or a part of the wireless communication devices locates indoors, while another part of the wireless communication devices locates outdoors; or the whole of the wireless communication devices locates outdoors. In addition, in another embodiment of the present disclosure, the moving path determining method, the wireless positioning devices, and the wireless positioning system may be not only applied to a two-dimensional map to indicate the position of the user but also applied to a three-dimensional space to smooth the trajectory of the user movement. In the embodiment, the wireless positioning system 10 comprises at least four wireless communication devices to respectively obtain the parameters such as distance, RTT, RSSI, AOA, TOA, TDOA, etc., with the user equipment to calculate a plurality of sampling positions of the user equipment in the three-dimensional space according to the parameters.

In an embodiment of the present disclosure, the cumulative time, the scanning frequency, the smoothing threshold, the direction-changed threshold, the averaging method, and the interpolation method are fixed. In another embodiment, the cumulative time, the scanning frequency, the smoothing threshold, the direction-changed threshold, the averaging method, and the interpolation method are variable, which may be obtained by retrieving pre-calibration values from a look-up table according to the practical scenario, or performing self-regression of the time series according to Wiener filter, Kalman filter, etc. In addition, the time series may be fed into artificial neural networks, including but not limited to a convolutional neural network, and adjusted to a suitable value through machine learning.

In the prior art, the user may not instantly obtain the current position through the positioning technology, or there is an unnatural jumping phenomenon, or an overfitting and a high-frequency trajectory noise may occur when the user moves. In contrast, an embodiment of the present disclosure obtains the mean position in the cumulative time and supplements the interpolated position appropriately by the interpolation method to smooth the moving path to improve over the disadvantages of the prior art.

In summary, an embodiment of the present disclosure performs positioning to the user equipment and at least three wireless communication devices in a cumulative time to obtain a plurality of valid sampling positions of the user equipment, applies an averaging method or an interpolation method to calculate a mean position of a plurality of valid sampling positions or an interpolated position corresponding to a plurality of previous positions, and appropriately supplements the interpolated position to smooth the moving path displayed on the map on the user equipment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A moving path determining method, applied to a user equipment, the moving path determining method comprising:
   performing positioning to at least three wireless communication devices via a scanning frequency in a cumulative time, to calculate a plurality of sampling positions;
   determining whether a measured distance value corresponding to each of the plurality of sampling positions of the at least three wireless communication devices is less than a predetermined value or not;
   removing the sampling position corresponding to the measured distance value less than the predetermined value within the plurality of sampling positions, to obtain a plurality of valid sampling positions;
   calculating a count value of the plurality of valid sampling positions; and
   determining a current position of the user equipment according to the count value and a smoothing threshold.

2. The moving path determining method of claim 1, wherein determining a current position of the user equipment further comprises:
   when the count value does not exceed the smoothing threshold, applying an interpolation method to the plurality of valid sampling positions to obtain an interpolated position, and setting the interpolated position to be the current position.

3. The moving path determining method of claim 1, wherein determining the current position of the user equipment further comprises:
   in the cumulative time, when the count value exceeds the smoothing threshold, applying an averaging method to obtain a mean position corresponding to the plurality of valid sampling positions, or applying an interpolation method to obtain an interpolated position corresponding to a plurality of previous positions of the user equipment; and determining to set the mean position or the interpolated position to be the current position according to the mean position and a channel width.

4. The moving path determining method of claim 3, wherein determining to set the mean position or the interpolated position to be the current position further comprises:
when the mean position is in the channel width, setting the mean position to be the current position.

5. The moving path determining method of claim 3, wherein determining to set the mean position or the interpolated position to be the current position further comprises:
when the mean position is out of the channel width, calculating an offset count value; and
comparing the offset count value with a direction changing threshold, and determining to set the mean position or the interpolated position to be the current position.

6. The moving path determining method of claim 5, wherein determining to set the mean position or the interpolated position to be the current position further comprises:
when the offset count value does not exceed the direction changing threshold, setting the interpolated position to be the current position, and storing the mean position.

7. The moving path determining method of claim 6, wherein determining to set the mean position or the interpolated position to be the current position further comprises:
when the offset count value exceeds the direction changing threshold, setting the mean position to be the current position, and adjusting the plurality of previous positions according to the plurality of stored mean positions.

8. The moving path determining method of claim 1, wherein performing positioning to the at least three wireless communication devices further comprises:
receiving a round-trip delay time to each of the wireless communication devices; and
calculating the measured distance value corresponding to each round-trip delay time.

9. A wireless positioning device, comprising:
a storage unit, storing a program code; and
a processing unit, coupled to the storage unit, wherein the processing unit loads the program code to execute the following steps:
performing positioning to at least three wireless communication devices via a scanning frequency in a cumulative time, to calculate a plurality of sampling positions;
determining whether a measured distance value corresponding to each of the plurality of sampling positions of the at least three wireless communication devices is less than a predetermined value or not;
removing the sampling position corresponding to the measured distance value less than the predetermined value within the plurality of sampling positions, to obtain a plurality of valid sampling positions;
calculating a count value of the plurality of valid sampling positions; and
determining a current position of the wireless positioning device according to the count value and a smoothing threshold.

10. The wireless positioning device of claim 9, further comprising:
when the count value does not exceed the smoothing threshold, applying an interpolation method to the plurality of valid sampling positions to obtain an interpolated position and setting the interpolated position to be the current position.

11. The wireless positioning device of claim 9, further comprising:
in the cumulative time, when the count value exceeds the smoothing threshold, applying an averaging method to obtain a mean position corresponding to the plurality of valid sampling positions, or applying an interpolation method to obtain an interpolated position corresponding to a plurality of previous positions of the wireless positioning device; and
determining to set the mean position or the interpolated position to be the current position according to the mean position and a channel width.

12. The wireless positioning device of claim 11, further comprising:
when the mean position is in the channel width, setting the mean position to be the current position.

13. The wireless positioning device of claim 11, further comprising:
when the mean position is out of the channel width, calculating an offset count value; and
comparing the offset count value with a direction changing threshold, and determining to set the mean position or the interpolated position to be the current position.

14. The wireless positioning device of claim 13, further comprising:
when the offset count value does not exceed the direction changing threshold, setting the interpolated position to be the current position, and storing the mean position.

15. The wireless positioning device of claim 14, further comprising:
when the offset count value exceeds the direction changing threshold, setting the mean position to be the current position, and adjusting the plurality of previous positions according to the plurality of stored mean positions.

16. The wireless positioning device of claim 9, wherein performing positioning to the at least three wireless communication devices further comprises:
receiving a round-trip delay time to each of the wireless communication devices; and
calculating the measured distance value corresponding to each of the round-trip delay time.

* * * * *